United States Patent Office 3,592,776
Patented July 13, 1971

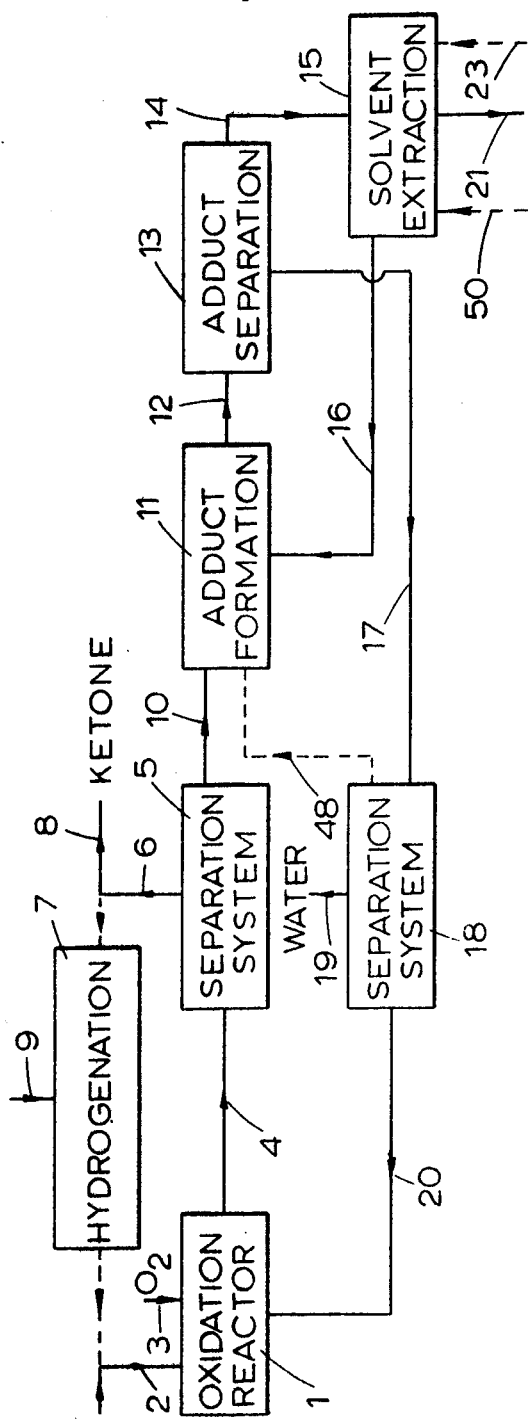

1

3,592,776
PRODUCTION OF HYDROGEN PEROXIDE
John Vincent Fletcher, Knutsford, and Dennis Martin, Cheadle Hulme, England, assignors to Burmah Oil Trading Limited, London, England
Filed Apr. 7, 1969, Ser. No. 813,907
Claims priority, application Great Britain, Apr. 5, 1968, 16,578/68
Int. Cl. C01b 15/02
U.S. Cl. 252—186
9 Claims

ABSTRACT OF THE DISCLOSURE

Hydrogen peroxide dissolved, e.g., in a secondary alcohol such as isopropanol is transferred from that solvent to another solvent by precipitating the hydrogen peroxide from its solution with urea, and mixing the resulting urea/hydrogen peroxide adduct with an extracting solvent constituted by a lower alkyl ketone, a lower alkyl ester or a lower alkyl ortho-phosphate, which mixing leads to dissolution of the hydrogen peroxide in the extracting solvent with simultaneous precipitation of the urea; the process is especially applicable to the case where the hydrogen peroxide has been produced from isopropanol—which leads to the production of a solution of the former in the latter—and it thus becomes possible to use the hydrogen peroxide thus obtained in a chemical reaction in which the presence of isopropanol as solvent is undesirable, e.g. in the production of a peroxy compound such as a percarboxylic acid.

Proposals have been made previously to produce hydrogen peroxide by various methods using a secondary alcohol as a starting material. In each of these cases it has been necessary to utilize the said hydrogen peroxide as a solution in the secondary alcohol. However, the reaction of carboxylic acids with hydrogen peroxide which is in solution in a secondary alcohol leads to the production of secondary alcohol esters and not the desired percarboxylic acid.

We have now found, surprisingly, that under certain conditions, described in detail hereinafter, it is possible to remove commercially and economically hydrogen peroxide from this secondary alcohol or any other solvent and then to transfer it into a different solvent, especially one which is very suitable for effecting chemical reaction such as the production of a peroxy compound.

The present invention provides a process for transferring hydrogen peroxide from one solvent to another solvent, which process comprises reacting a hydrogen peroxide solution with a solution (preferably a saturated aqueous one) of urea to give a precipitate of an adduct thereof and hydrogen peroxide in the molar ratio of 1:1 and mixing the adduct with an extracting solvent selected from the group consisting of alkyl ketones with up to 7 carbon atoms, alkyl esters with up to 7 carbon atoms and alkyl ($C_1$ to $C_4$) ortho-phosphates, whereby the hydrogen peroxide is dissolved in said solvent and the urea is precipitated, the process being carried out in the essential absence of heavy metal ions and under conditions minimizing decomposition.

The starting material hydrogen peroxide solution (which may have, for example, a hydrogen peroxide concentration of from 1 to 25% by weight) is preferably obtained by oxidizing in the liquid phase a secondary alcohol having 3 to 6 carbon atoms (isopropanol is preferred) with oxygen or a gas containing oxygen (for example air) at an elevated temperature (e.g. 80 to 160° C.), in the absence of heavy metal ions or compounds giving rise to heavy metal ions, at a pressure sufficient to maintain said

2 alcohol and the reaction product (comprising unreacted secondary alcohol, hydrogen peroxide and a ketone) in the liquid phase and removing the ketone from the hydrogen peroxide and unreacted secondary alcohol.

While elevated temperatures may be used for the mixing of the adduct with the extracting solvent, temperatures in excess of 100° C. tend to aid the formaion of undesirable by-products which are usually of a peroxidic nature; this is especially marked when the preferred extracting solvent, i.e. acetone, is used. High temperatures may also tend to aid the violent decomposition of these peroxides. Thus, whilst high temperatures increase the speed of the operation and permit smaller equipment to be used, the disdvantages stated above may be of greater importance.

In the process of the present invention one selectively removes the hydrogen peroxide from the adduct with one of the above extracting solvents, in which urea has a solubility of 30% or less, thus leaving a residue of solid urea which may be used to form more adduct. Among the solvents which are suitable for this extraction are, for example, acetone, ethyl acetate, n-propyl acetate and triethyl phosphate. It can be seen from the following table that the extraction efficiency (defined as the weight of hydrogen peroxide extracted divided by the weight of total hydrogen peroxide originally present in the adduct) varies from solvent to solvent. It is also desirable to leave as much residue of urea as possible, but this depends upon two factors:

(1) The solubility of the urea in the solvent.
(2) The concentration of the hydrogen peroxide in the extracting solvent.

It is possible by careful selection of the extracting solvent to minimize (1); (2) may be minimized by using dilute hydrogen peroxide solutions only. The table given below shows the extraction efficiency and solubility of the urea for various solvents at 22° C.

| Solvent | Extraction efficiency, percent | Urea solubility in pure solvents, percent[1] |
|---|---|---|
| Acetone | 100 | <0.5 |
| Ethyl acetate | 8.1 | <0.5 |
| Triethyl phosphate | 78 | 17 |
| Tri-n-butyl phosphate | 40 | <0.5 |
| n-Propyl acetate | 8.0 | <0.5 |

[1] Defined as grams of urea divided by 100 grams of pure anhydrous solvent.

Table 2, given below, shows the solubility of urea in solution of varying concentrations of hydrogen peroxide, the urea being substantially insoluble in the pure solvent.

TABLE 2

Solubility of urea in an acetone solution of $H_2O_2$ (a solvent in which urea is substantially insoluble)/ (grams per 100 grams solution)

| Concentration of $H_2O_2$, percent | Solubility of urea, percent |
|---|---|
| 8.3 | 6.0 |
| 5.6 | 4.2 |
| 4.0 | 3.5 |
| 2.1 | 1.9 |
| 1.0 | 0.8 |

A similar relationship exists with other pure solvents in which the urea is substantially insoluble; thus the total solubility of urea in the extracts will be the sum of the solubilities stated in Tables 1 and 2. For example, an 8% solution of $H_2O_2$ in acetone will dissolve about 6.0% of urea. In order to use solvents above their boiling points for extraction purposes super-atmospheric pressures may be used; thus, temperature is limited by the thermal decomposition and/or chemical stability of the hydrogen peroxide in the solvent. The explosion hazards in handling hydrogen peroxide especially in the presence of acetone and at elevated temperatures are well known and hence known precautions must be observed. Furthermore, interaction of hydrogen peroxide with acetone is known to occur at elevated temperatures resulting in the formation of a cyclic trimer. Thus it is desirable to use relatively low temperatures, usually less than 100° C. On the other hand, a similar reaction with tri-n-butyl-phosphate apparently does not take place and the upper temperature limit is limited only by the thermal decomposition of hydrogen peroxide.

One method of carrying out the process of the invention is as follows:

A secondary alcohol with at least three carbon atoms, which preferably contains a maximum of six carbon atoms (isopropyl alcohol is preferred, though secondary butyl alcohol and cyclohexanol are also suitable), is oxidized in the liquid phase with oxygen or a gas containing oxygen at a temperature between 80° C. and 160° C. under a pressure which is at least sufficient to allow the alcohol to remain in the liquid phase. Pressures of 50 atmospheres and above may usefully be employed with respect to improved recovery of the more volatile material present. The explosion hazards in carrying out this oxidation are well known and known conditions to obviate them must be adopted.

As indicated above, the essential exclusion of heavy metal ions and compounds yielding ions of such metals is important and the reaction is best conducted in a vessel constructed of glass (or similar siliceous material), aluminium, tin or carefully passivated stainless steel. No catalyst or actinic light is required for this procedure but it is desirable to initiate the reaction with a peroxidic substance, for example hydrogen peroxide, or a substance which readily produces free radicals, e.g. azobisisobutyronitrile.

The ketone formed as a co-product in the oxidation may be sold commercially or converted by hydrogenation to the corresponding secondary alcohol and recycled to the process. The use of air as the preferred oxidizing gas does not exclude the use of a gas with other oxygen concentration and indeed the use of commercially avialable pure oxygen (i.e. 99% pure) may confer certain advantages with regard to solvent loss, heat recovery and operating costs.

The oxidation of the secondary alcohol may be conducted in a batch or continuous manner and the peroxidic product, constituted mainly by hydrogen peroxide, is allowed to accumulate to a preferred concentration of 8 to 15%, although it should be noted that concentrations as low as 1% and as high as 25% may be successfully utilized.

The mixture of secondary alcohol and peroxidic product, from which any ketone still present must be separated before further processing by distillation or other techniques, is then reacted with a concentrated saturated aqueous solution of the urea, so that the resulting adduct thereof and the hydrogen peroxide is precipitated from the mixture. Elevated temperatures may be used, i.e. temperatures above room temperature up to a temperature at which the aqueous solution of urea is stable. For temperatures greater than about 100° C., super-atmospheric pressures are required of which the permissible upper limit depends on the degradation temperature of the said substituted urea solution and of the hydrogen peroxide. The precipitate of the adduct formed is crystalline. This adduct is filtered from the mother liquor which is recycled to a distillation column to separate the secondary alcohol for re-use in the process, water and any urea being also removed in known manner. It is then mixed with a solvent which extracts the hydrogen peroxide from the adduct and leaves behind the bulk of the urea, the solubility of the urea in the mixture being dependent upon the concentration of the hydrogen peroxide in the solvent.

The use of a dry solvent (i.e. containing 0.5% by weight of water or less), which is easily produced by azeotropic distillation or other well known means, for the extraction of the adduct confers certain advantages in the recovery of the urea by minimizing the solubility of this material in the liquid medium, i.e. the peroxides are selectively removed in solution from the adduct and the portion of the urea which dissolves in the solution is due, inter alia, to the solubilizing effect of the hydrogen peroxide in the solution, whilst the urea remains as a solid; the remaining solid is then redissolved in water and may be re-used in the formation of more adduct. The urea which is in this mixture may be recovered at a later stage and returned to the process.

The carrying out of the process of the invention is illustrated in the accompanying diagrammatic drawing which shows a block diagram of the stages of the process. Referring to the drawing, secondary alcohol (i.e. isopropanol) feed to oxidation reactor 1 (described below) is derived partly by recycling of unreacted secondary alcohol via line 20 from a separation system 18 constituted, e.g., by a plurality of distillation units and partly by the addition of secondary alcohol via line 2.

In the reactor 1, the secondary alcohol is oxidized with oxygen or an oxygen containing gas which is fed to the reactor via line 3. The resulting oxidized mixture is removed by line 4 to a separation system 5 consisting of a distillation unit in which the co-product ketone is separated by distillation from the oxidized mixture, and removed via line 6. The ketone is then removed as a by-product through line 8 or is passed to a hydrogenation reactor 7 (e.g. a fixed bed catalytic one), in which it is reacted with hydrogen supplied via line 9, to form the secondary alcohol which may be recycled to the reactor via line 2. The remainder of the oxidized mixture, after separation of the ketone in the separation system 5, is passed via line 10 to an adduct formation stage 11 constituted by a stirred tank, e.g. of aluminium, where it is reacted with an aqueous solution of urea recycled from solvent extraction stage 15 constituted by another stirred tank, e.g. of aluminium, via line 16. Instead of a stirred tank, the extraction stage 15 can take the form of a column of the adduct, the solvent being passed through said column in countercurrent fashion. The mixture, now containing the crystalline adduct, is passed via line 12 to adduct separation stage 13 consisting of a filter, whereupon the solid adduct is separated and passed via line 14 to the solvent extraction stage 15, while the mother liquor is passed via line 17 to separation stage 18, in which water is separated as an azeotrope and removed via line 19, and unreacted urea is removed via line 48 in known manner to the adduct formation stage 11; the essentially anhydrous secondary alcohol is recycled via line 20 to the oxidation reactor 1. The hydrogen peroxide solution in the extracting solvent leaves solvent extraction stage 15 by line 21, while the extracting solvent enters via line 23 or line 50.

The following examples illustrate the inention; the procedure used in all these examples was the one described with reference to the drawing.

EXAMPLE 1

1060 cc. of a solution containing 1000 cc. of isopropanol, 40 cc. of acetone and 20 cc. of 86% aqueous hydrogen peroxide were oxidized with air, which passed through the solution at a rate of 1060 cc./min. for four hours, in a glass lined reactor at 105° C. and 35 p.s.i.g. A suitable such glass lined reactor is described in U.S. Pat. No. 2,871,104 of F. F. Rust, patented Jan. 27, 1959. The co-product acetone was removed as an overhead stream by condensation from the spent air passing from the reactor. The resulting peroxidic solution was cooled to 50° C., and treated with 237 cc. of a saturated aqueous urea solution, also at 50° C.

The resulting urea/hydrogen peroxide adduct of the formula $NH_2CONH_2 \cdot H_2O_2$ which immediately precipitated from the mixture was filtered from the mixture and dried. The adduct was then decomposed by stirring with 1025 cc. of acetone at 20° C. producing an acetone solution containing 52 g. of hydrogen peroxide and 39 g. of urea, while the bulk of the urea remained as a solid which was dried and re-used as above.

In the following Examples 2 to 5 the urea/hydrogen peroxide adduct was produced as in Example 1.

EXAMPLE 2

1000 g. of the urea/hydrogen peroxide adduct was counter-currently extracted with 6,800 ml. of n-propyl acetate. The resulting solution of hydrogen peroxide contained a small quantity of urea, while the bulk of the urea remained as a solid which was dried and re-used as above.

EXAMPLE 3

100 g. of the urea/hydrogen peroxide adduct was extracted with 100 ml. of ethyl acetate. The resulting solution contained 8.1 g. of hydrogen peroxide and 0.3 g. of urea, while the bulk of the urea remained as a solid which was dried and re-used as above.

EXAMPLE 4

500 g. of the urea/hydrogen peroxide adduct was decomposed with 3000 ml. of tri-n-butyl-phosphate. The resulting solution of hydrogen peroxide contained a small amount of urea, while the bulk of the urea remained as a solid which was dried and re-used as above.

EXAMPLE 5

500 g. of the urea/hydrogen peroxide adduct was extracted counter-currently with 3400 ml. of n-propyl acetate. The resulting solution of hydrogen peroxide contained a small amount of urea, while the bulk of the urea remained as a solid which was dried and re-used as above.

The invention described herein is closely associated with the invention described in copending application Nos. 813,899, 813,847, and 813,832, all filed on Apr. 7, 1969 [1] and the disclosures of said copending applications are incorporated herein by reference.

Although the present invention is described herein with particular reference to specific details, it is not intended that such details shall be regarded as limitations upon the scope of the invention except insofar as included in the accompanying claims.

---
[1] Entitled, respectively, "Improvements in or Relating to the Production of Propylene Oxide," "Improvements in or Relating to the Production of Percarboxylic Acids" and "Improvements in or Relating to the Production of Epoxides, Glycols and Glycol Esters" and filed concurrently herewith.

We claim:

1. A process for transferring hydrogen peroxide from one solvent to another solvent, which process comprises reacting a hydrogen peroxide solution with an aqueous solution of urea to give a precipitate of an adduct thereof and hydrogen peroxide in the molar ratio of 1:1 and mixing the adduct with an extracting solvent selected from the group consisting of alkyl ketones with up to 7 carbon atoms, alkyl esters with up to 7 carbon atoms and alkyl$_{(C1\ to\ C4)}$ ortho-phosphates, whereby the hydrogen peroxide is dissolved in said solvent and the urea is precipitated, the process being carried out in the essential absence of heavy metal ions and under conditions minimizing decomposition.

2. A process according to claim 1, in which the starting material hydrogen peroxide solution has a hydrogen peroxide concentration of from 1 to 25% by weight.

3. A process according to claim 2, in which the starting material hydrogen peroxide solution has been obtained by oxidizing in the liquid phase a secondary alcohol having 3 to 6 carbon atoms with oxygen or a gas containing oxygen at an elevated temperature, in the essential absence of heavy metal ions and under conditions minimizing decomposition, at a pressure sufficient to maintain said alcohol and the reaction product (comprising unreacted secondary alcohol, hydrogen peroxide and a ketone) in the liquid phase and removing the ketone from the hydrogen peroxide and unreacted secondary alcohol.

4. A process according to claim 3, in which said secondary alcohol is isopropanol.

5. A process according to claim 1, in which said urea solution is a saturated aqueous one.

6. A process according to claim 1, in which said extracting solvent is acetone.

7. A process according to claim 1, in which said extracting solvent is n-propyl acetate.

8. A process according to claim 1, in which said extracting solvent is ethyl acetate.

9. A process according to claim 1, in which the starting material hydrogen peroxide solution is a hydrogen peroxide solution in isopropanol having a concentration of from 1 to 25% by weight, the urea solution is a saturated aqueous one, the extracting solvent is selected from the class consisting of acetone, ethyl acetate and n-propyl acetate and the starting material hydrogen peroxide solution has been obtained by oxidizing in the liquid phase isopropanol with oxygen or a gas containing oxygen at an elevated temperature, in the essential absence of heavy metal ions and under conditions minimizing decomposition, at a pressure sufficient to maintain the isopropanol and the reaction product (comprising unreacted isopropanol, hydrogen peroxide and acetone) in the liquid phase and removing the acetone from the hydrogen peroxide and unreacted isopropanol.

References Cited

UNITED STATES PATENTS

| | | | |
|---|---|---|---|
| Re. 25,114 | 1/1962 | Hood et al. | 23—207 |
| 2,823,172 | 2/1958 | Rumberger | 260—96.5 |
| 3,012,860 | 12/1961 | Meeker et al. | 23—207 |
| 3,247,177 | 4/1966 | Hepp | 260—96.5 |

RICHARD D. LOVERING, Primary Examiner

I. GLUCK, Assistant Examiner

U.S. Cl. X.R.

8—111; 23—207, 207.5; 252—95; 260—96.5, 555